R. H. WEST.
LATHE DOG.
APPLICATION FILED OCT. 16, 1911.
1,032,639.
Patented July 16, 1912.
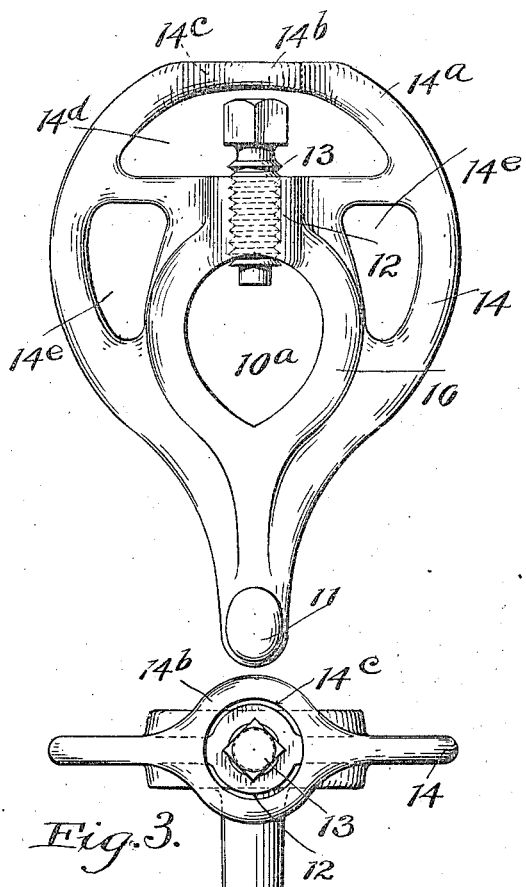
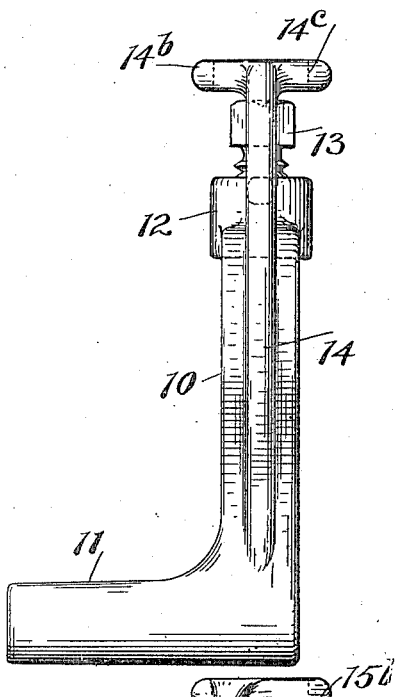
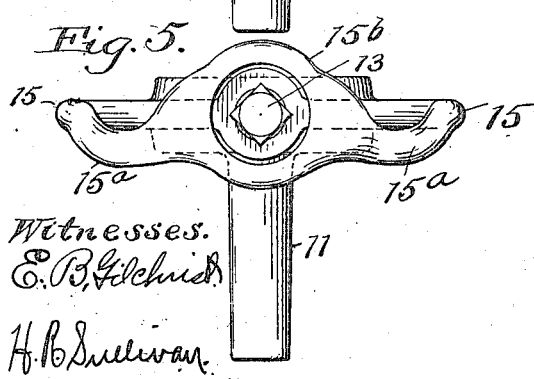
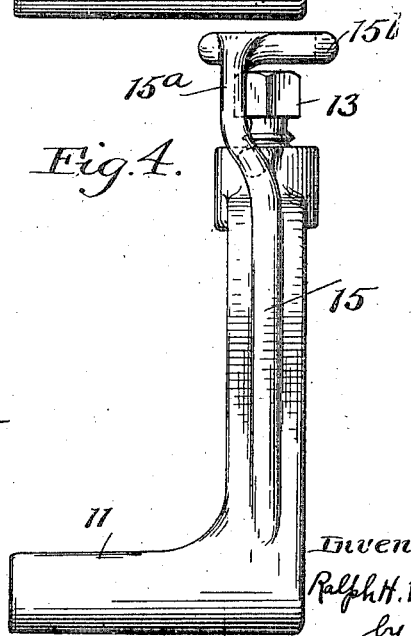
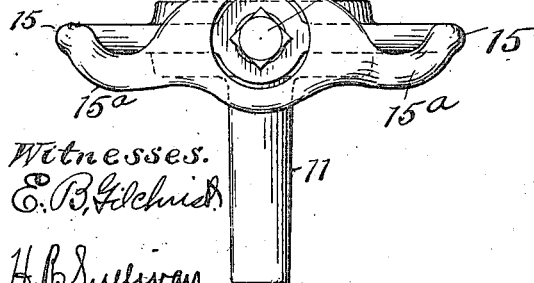

UNITED STATES PATENT OFFICE.

RALPH H. WEST, OF CLEVELAND, OHIO.

LATHE-DOG.

1,032,639.    Specification of Letters Patent.    Patented July 16, 1912.

Application filed October 16, 1911. Serial No. 654,881.

*To all whom it may concern:*

Be it known that I, RALPH H. WEST, a citizen of the United States, residing at Cleveland, in the county of Cuyahoga and State of Ohio, have invented a certain new and useful Improvement in Lathe-Dogs, of which the following is a full, clear, and exact description.

In the ordinary lathe-dog consisting of the substantially annular body; tail or tailpiece for connection with the face plate of a lathe; and set screw for securing the dog to the work, a portion of the set screw, including at least, the head, projects outward and when in rapid rotation is liable to catch in the clothing of the workman and often does so with disastrous results in the way of personal injury.

The present invention relates to lathe-dogs and has for its principal object to provide a practical and commercially successful form of dog, which is inexpensive to manufacture, and which has a guard for the set screw arranged so as to eliminate or at least minimize the danger of the screw catching or being entangled in the workman's clothing.

Still further, the invention aims to provide on the dog a set screw guard and to accomplish this by means of a construction which materially strengthens the dog and facilitates the handling or adjusting of the dog and at the same time reduces the liability of injury to the hands or fingers of the workman.

The above and other objects are accomplished by my invention, which may be briefly summarized as consisting of certain novel details of construction and arrangements of parts which will be described in the specification and set forth in the appended claims.

In the drawings wherein I have shown two slightly different forms of my invention, Figure 1 is a face view of my improved lathe dog; Fig. 2 is a side view of the same; Fig. 3 is a top plan view; Fig. 4 is a side view of a dog slightly modified in form; and Fig. 5 is a top plan view of a dog shown in Fig. 4.

Referring now to the drawing, it will be seen that the dog includes a body 10 which has an opening 10ª for the work, a tail or tail piece 11, which may be of the angular or bent type, as shown, or may be straight, and diametrically opposite the tail, a boss 12 having a threaded opening for a set screw 13 for fastening or clamping the dog to the work.

The ordinary form of lathe dog consists of these parts alone, a portion of the set screw projecting outwardly beyond the boss in a manner such that the head of the screw which is usually rough and irregular in shape can and often does catch in the clothing of the workman.

For the attainment of the objects previously mentioned, the body 10 of the dog is provided with an external flange or rib 14 which extends centrally about the body down to and long the tail piece. Considering the part of the dog having the boss and set screw as the upper part, it will be seen that this flange 14 extends outwardly from the body a greater distance at the top than at the sides, the periphery of the upper part of the flange being nearly semi-circular with the curve struck from a center somewhat above the axis of rotation of the dog. At its extremity, opposite the boss, the flange is about the same or at a less distance from the axis of rotation of the dog than the extremity of the tail. This flange has a portion 14ª which bridges or extends over the boss and forms an integral arched guard for the set screw 13, the part directly opposite the boss and set screw being flat and in the form of a ring 14ᵇ having an opening 14ᶜ, concentric with the threaded opening for the set screw. Between this bridging portion and the boss there is provided an opening 14ᵈ, the bottom of which is flush with the top of the boss and which extends laterally outward toward the periphery of the flange on both sides of the boss, thus forming between the bridging portion 14ª and the boss a sector shaped open space for the manipulation of a wrench employed for adjusting the set screw. Inasmuch as the flange 14 is quite thin, as shown in the side and plan views, the permissible throw of the wrench is only slightly less than 180°.

The opening 14ᶜ in the ring 14ᵇ directly above the boss and set screw opening, is primarily for the purpose of permitting the insertion of the set screw through the guard and into the threaded opening, thus doing away with the necessity of having the space between the guard and the boss of sufficient height to permit the insertion of the set screw laterally between these parts. This opening 14ᶜ is preferably sufficiently large to permit the insertion and manipulation of a socket wrench for the adjustment of the set screw when the head thereof is directly in the ring 14$^b$ and not accessible either above or below the same with an ordinary jaw wrench.

Below the opening 14$^d$ and on opposite sides of the boss and body 10, openings 14$^e$ are formed, the purpose of which is not only to lighten the dog and to effect a saving in metal, but the principal object of these openings 14$^e$ is to facilitate the handling and adjustment of a dog, particularly when the dog is being fastened to the work and connected to the face plate of the lathe. Ordinarily, when a workman shifts the dog along the work before the set screw is fastened, and inserts the tail piece in the slot of the face plate, he usually shifts the dog by grasping the same at the tail, and in so doing, it is often the case that his fingers or hands are injured. However, the openings 14$^e$ form handles or hand holds by which the dog may be easily turned on the work and moved lengthwise thereof to insert or remove the tail piece from the face plate, without any danger of personal injury.

In Figs. 5 and 6 I have shown a slight modification wherein the flange, here designated 15, has its upper portion 15$^a$, which constitutes the bridging guard, somewhat offset to one side of the center plane of the body of the guard, thereby permitting the wrench used in adjusting the screw to have a longer throw. In this case, the wrench may be moved fully 180° in either direction. Even though the upper portion is offset, as clearly shown in the drawing, the ring 15$^b$ having the opening through which the screws may be inserted is directly above and in alinement with the boss and set screw, as in the construction first described. It will therefore be seen that the integral guard which I have provided will serve very effectually for the purpose intended and at the same time is embodied with parts which are so arranged with respect to the body of the dog as to materially strengthen the same. At the same time, the dog is not greatly increased in weight, nor is the increase in expense over that of an ordinary dog a matter of any importance. Additionally, as before stated, these parts so permit the handling and the adjusting of the dog with less liability of injury than heretofore.

I do not desire to be confined to the exact details shown, but aim in my claims to cover all modifications which do not involve a departure from the spirit and scope of my invention.

Having thus described my invention, what I claim is:

1. A lathe dog comprising a body having an opening for the work, a tail piece, and a threaded opening for a set screw at substantially right angles to the opening for the work, said body being provided with an integral set screw guard which bridges and overlies the set screw opening, there being between the body and guard a space for the manipulation of a wrench.

2. A lathe dog comprising a body having a tail piece, an opening for the work, and a threaded opening for a set screw arranged at substantially right angles to the opening for the work, a guard integral with the body and bridging the set screw opening, said guard having in alinement with the threaded set screw opening an opening for the insertion of the set screw through the guard, and there being between the body and guard a space for the manipulation of a wrench.

3. A lathe dog comprising a body having an opening for the work and provided with a tail piece and a threaded opening for a set screw, and said body having an external integral flange, a portion of the flange bridging the opening for the set screw and constituting a guard, said guard having an opening for the insertion of the set screw through the guard, and there being between the guard and body an opening for the manipulation of a wrench.

4. A lathe dog comprising a body having an opening for the work and provided with a tail piece and with a threaded opening for a set screw, said body having a narrow flange extending about the same, the portion of the flange opposite the threaded opening forming a guard for a set screw and having centrally in said portion a laterally enlarged flat portion provided with an opening for the insertion of the set screw through the guard, there being between the guard and the body, an open space for the manipulation of a wrench for adjusting the set screw.

In testimony whereof, I hereunto affix my signature in the presence of two witnesses.

RALPH H. WEST.

Witnesses:
H. R. SULLIVAN,
A. F. KWIS.